United States Patent
Iguchi et al.

(10) Patent No.: US 11,842,855 B2
(45) Date of Patent: Dec. 12, 2023

(54) MULTILAYER ELECTRONIC COMPONENT WITH ALTERNATING DIELECTRIC AND INTERNAL ELECTRODE LAYERS

(71) Applicant: TDK CORPORATION, Tokyo (JP)

(72) Inventors: Toshihiro Iguchi, Tokyo (JP); Masahide Ishizuya, Tokyo (JP); Takeshi Shibahara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 75 days.

(21) Appl. No.: 17/521,305

(22) Filed: Nov. 8, 2021

(65) Prior Publication Data

US 2022/0165502 A1  May 26, 2022

(30) Foreign Application Priority Data

Nov. 25, 2020 (JP) ................. 2020-195394

(51) Int. Cl.
*H01G 4/30* (2006.01)
*H01G 4/012* (2006.01)
*H01G 4/12* (2006.01)

(52) U.S. Cl.
CPC .............. *H01G 4/30* (2013.01); *H01G 4/012* (2013.01); *H01G 4/12* (2013.01)

(58) Field of Classification Search
CPC .................. H01G 4/30; H01G 4/005
See application file for complete search history.

(56) References Cited

U.S. PATENT DOCUMENTS

| | | | | |
|---|---|---|---|---|
| 2013/0027839 A1* | 1/2013 | Kim | ............ | H01G 4/30 361/321.2 |
| 2013/0063862 A1* | 3/2013 | Kim | ............ | H01G 4/30 156/182 |
| 2013/0342956 A1* | 12/2013 | Konishi | ............ | H01G 4/005 361/301.4 |
| 2014/0022698 A1* | 1/2014 | Jeong | ............ | H01G 4/30 361/321.2 |
| 2018/0090273 A1* | 3/2018 | Hwang | ............ | H01G 4/2325 |
| 2018/0182549 A1 | 6/2018 | Koide et al. | | |
| 2021/0035740 A1* | 2/2021 | Kim | ............ | H01G 4/1227 |
| 2021/0043380 A1* | 2/2021 | Ishibe | ............ | H01G 4/2325 |
| 2021/0142947 A1* | 5/2021 | Teraoka | ............ | H01G 4/012 |

FOREIGN PATENT DOCUMENTS

JP 2018-107413 A 7/2018
KR 20140016978 A * 2/2014

* cited by examiner

*Primary Examiner* — David M Sinclair
*Assistant Examiner* — Daniel M Dubuisson
(74) *Attorney, Agent, or Firm* — Oliff PLC

(57) ABSTRACT

To provide a multilayer electronic component of which a reliability is not compromised and also a crack is suppressed from forming even when the multilayer electronic component is made thinner. A multilayer electronic component including an element body in which at least one dielectric layer and at least one internal electrode layer are stacked in an alternating manner, wherein a thickness variation of the at least one internal electrode layer is larger than a thickness variation of the at least one dielectric layer.

6 Claims, 5 Drawing Sheets

MULTILAYER ELECTRONIC COMPONENT WITH ALTERNATING DIELECTRIC AND INTERNAL ELECTRODE LAYERS

TECHNICAL FIELD

The present invention relates to a multilayer electronic component including at least one dielectric layer and at least one internal electrode layer.

BACKGROUND

As a multilayer ceramic capacitor becomes thinner, a thickness variation of the dielectric layers tends to become large, and a reliability tends to be compromised easily. For example, in order to improve the reliability, Patent Document 1 discloses a multilayer ceramic electronic component in which the thickness variation of the dielectric layers is within a range of 100 nm or less.

However, when the thickness variation of the dielectric layers is suppressed, the present inventors have found that a crack tends to easily form at an interface between an internal electrode layer and a dielectric layer.

[Patent Document 1] JP Patent Laid Open No. 2018-107413

SUMMARY

The present disclosure is achieved in view of such circumstances and the object of the present disclosure is to provide a multilayer electronic component of which a reliability is not compromised and also a crack formation is suppressed even when the multilayer electronic component is made thinner.

In order to achieve the above object, the multilayer electronic component according to the present invention includes an element body in which at least one dielectric layer and at least one internal electrode layer are stacked in an alternating manner, wherein a thickness variation of the at least one internal electrode layer is larger than a thickness variation of the at least one dielectric layer.

The present inventors have found that when the multilayer electronic component satisfies the above-mentioned configuration, even when the multilayer electronic component is made thinner, a good reliability is maintained and also a crack formation is suppressed. Reasons behind this are thought as describe in below. In the present disclosure, because the thickness variation of the internal electrode layers is large, a contacting area between the dielectric layers and the internal electrode layers is increased, thus a crack formation is suppressed. Also, since the thickness variation of the dielectric layers is small, a reliability can be enhanced. Note that, a good reliability means a long accelerated lifetime and also a high breakdown voltage.

Preferably, a thickness of a dielectric layer selected from the at least one dielectric layer and a thickness of an internal electrode layer selected from the at least one internal electrode layer which is adjacent to the dielectric layer in a stacking direction may have a negative correlation.

Preferably, a thickness standard deviation of the at least one internal electrode may be larger than a thickness standard deviation of the at least one dielectric layer.

Preferably, a thickness variance of the at least one dielectric layer may be statistically significantly smaller than a thickness variance of the at least one internal electrode layer.

Preferably, an average thickness of the at least one internal electrode layer may be thicker than an average thickness of the at least one dielectric layer.

Preferably, a coating ratio of the at least one internal electrode layer may be 85% or more.

DETAILED DESCRIPTION

First Embodiment

Configuration of Multilayer Ceramic Capacitor as a Whole

As an embodiment of a multilayer electronic component according to the present disclosure, a configuration of a multilayer ceramic capacitor as a whole is described.

Figure 1:
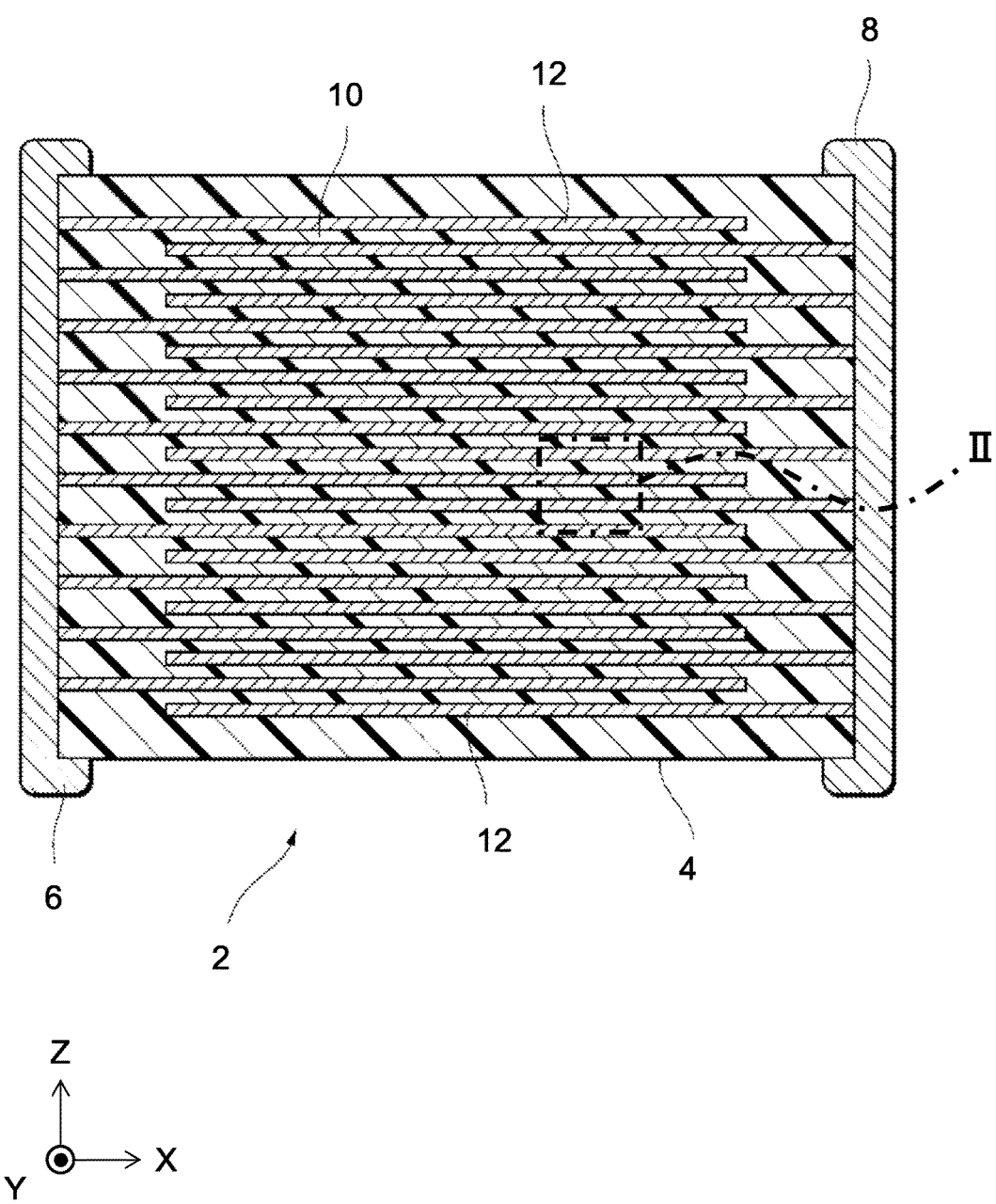
FIG. 1 is a cross section of a multilayer ceramic capacitor according an embodiment of the present disclosure.

As shown in FIG. 1, the multilayer ceramic capacitor 2 according to the present embodiment includes an element body 4, a first terminal electrode 6, and a second terminal electrode 8. The element body 4 includes at least one dielectric layer 10 and at least one internal electrode layer 12; and the at least one dielectric layer 10 and the at least one internal electrode layer 12 are stacked in an alternating manner.

In the present embodiment, one end of an internal electrode layer 12 is electrically connected to an inner side of a first terminal electrode 6 formed at outer side at an X-axis direction first end of the element body 4. Also, one end of another internal electrode layer 12 is electrically connected to an inner side of a second terminal electrode 8 formed at outer side at an X-axis direction second end of the element body 4.

A shape and a size of the multilayer ceramic capacitor 2 may be determined accordingly depending on the purpose and the usage. When the multilayer ceramic capacitor 2 has a rectangular parallelepiped shape, a size in X-axis direction may preferably be within a range of 0.4 to 3.2 mm.

A height (a size in Z-axis direction) of the multilayer ceramic capacitor 2 may preferably be within a range of 0.2 to 2.5 mm although the height may vary depending on the number of stacked layers of the dielectric layers 10 and the internal electrode layers 12. Also, a size in Y-axis direction of the multilayer ceramic capacitor 2 may preferably be within a range of 0.2 to 2.5 mm.

The number of stacked layers of the dielectric layers 10 is not particularly limited, and it may preferably be 20 or more, and more preferably it may be 50 or more.

A material of the dielectric layers 10 is not particularly limited, and the dielectric layers 10 may be constituted by a dielectric material having a perovskite structure such as $ABO_3$ and the like. In $ABO_3$, A is at least one selected from Ca, Ba, and Sr; and B is at least one selected from Ti and Zr. A molar ratio of A/B is not particularly limited, and it may be within a range of 0.980 to 1.020. Also, subcomponents such as Mn compounds, Mg compounds, Cr compounds, Co compounds, Ni compounds, rare earth elements, Si compounds, Li compounds, B compounds, and the like may be added to these main components.

A conductive material included in the internal electrode layers 12 is not particularly limited. As precious metals used as the conductive material, for example, Pd, Pt, Ag—Pd alloy, and the like may be mentioned. As base metals used as the conductive material, for example, Ni, Ni-based alloy, Cu, Cu-based alloy, and the like may be mentioned. Note that, 0.1 mass % or less of various trace components such as P and/or S and the like may be included in Ni, Ni-based alloy, Cu, or Cu-based alloy. Also, the internal electrode layers 12 may be formed by using a commercially available electrode paste.

A conductive material included in the first terminal electrode 6 and the second terminal electrode 8 is not particularly limited. For example, a known conductive material such as Ni, Cu, Sn, Ag, Pd, Pt, Au, alloy of these, conductive resins, and the like may be used. A thickness of the first terminal electrode 6 and a thickness of the second terminal electrode 8 may be determined depending on a purpose of use.

Figure 2:
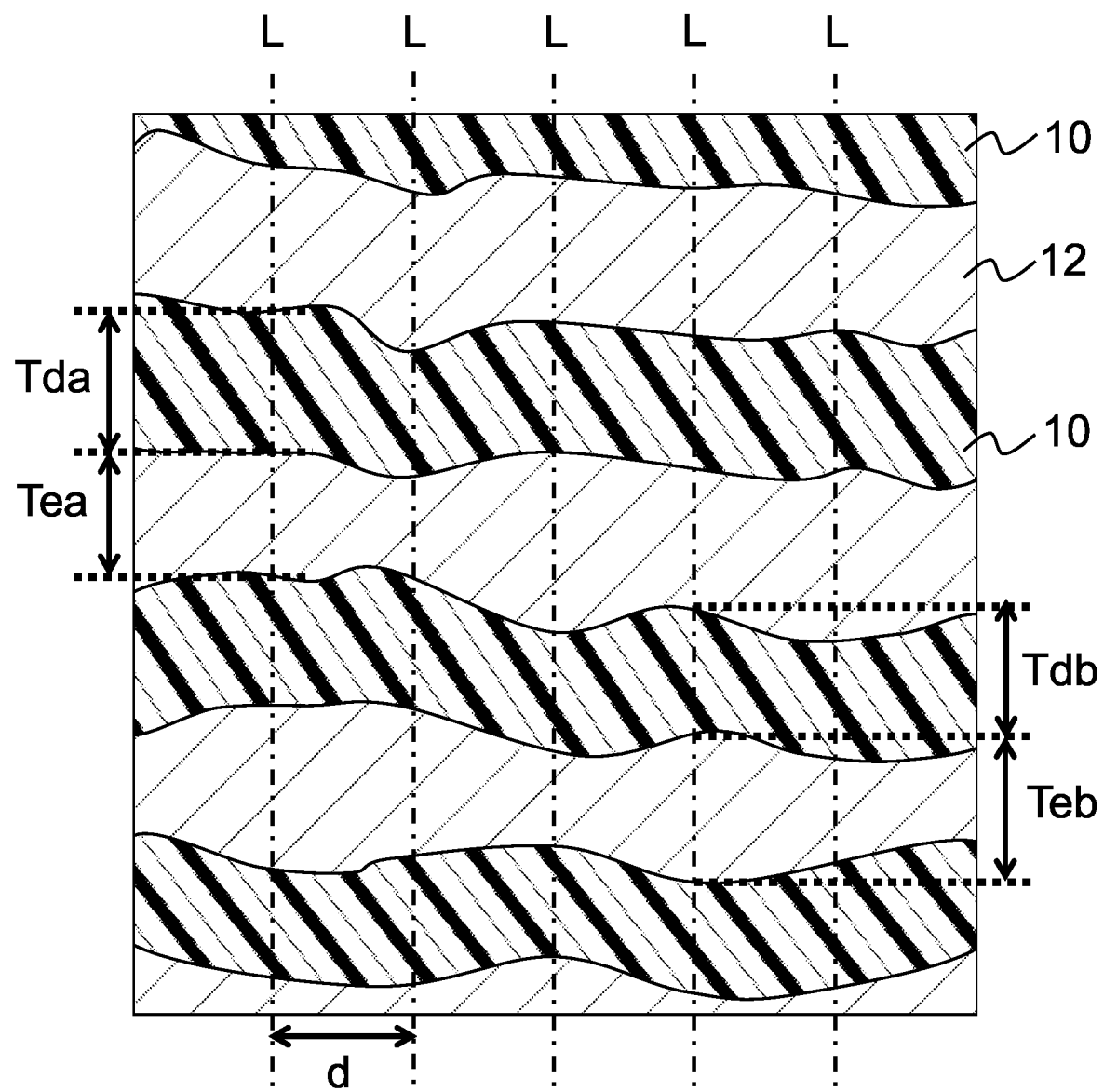
FIG. 2 is an enlarged cross section of II part shown in FIG. 1.

FIG. 2 is an enlarged cross section of II part shown in FIG. 1. In the present embodiment, as shown in FIG. 2, the dielectric layers 10 and the internal electrode layers 12 both have thickness variations.

In the present embodiment, the thickness variation of the internal electrode layers 12 is larger than the thickness variation of the dielectric layers 10.

Specifically, a thickness standard deviation of the internal electrode layers 12 may preferably be larger than a thickness standard deviation of the dielectric layers 10. When the thickness standard deviation of the dielectric layers 10 (dielectric σ) with respect to the thickness standard deviation of the internal electrode layers 12 (electrode σ) is expressed as "(dielectric σ)/(electrode σ)", then "(dielectric σ)/(electrode σ)" is preferably within a range of 0.4 or more and 1.0 or less, and more preferably 0.4 or more and 0.8 or less.

In the present embodiment, by measuring thicknesses of the at least one dielectric layer 10 from 100 positions or more, the thickness standard deviation of the at least one dielectric layer 10 is preferably obtained. Also, in the present embodiment, by measuring of the thicknesses of the at least one internal electrode layer 12 from 100 positions or more, the thickness standard deviation of the at least one internal electrode layer 12 is preferably obtained.

Note that, "a standard deviation" is a positive square root of "a variance", hence when a thickness variation is large, "the variance" becomes large and "the standard deviation" is also large. On the contrary to this, when thickness variation is small, "the variance" becomes small and "the standard deviation" is also small.

In the present embodiment, the thickness variance of the dielectric layers 10 is preferably statistically significantly smaller than the thickness variance of the internal electrode layers 12. Specifically, the thickness variance of the dielectric layers 10 can preferably be determined smaller than the thickness variance of the internal electrode layers 12, when a one-tailed F-test at a significance level of 0.05 is performed.

First, in the one-tailed F-test, a null hypothesis is proposed which is "the thickness variance of the at least one dielectric layer 10 and the thickness variance of the at least one internal electrode layer 12 have no difference (homoscedastic)". Next, an alternative hypothesis is proposed which is "the thickness variance of the at least one dielectric layer 10 is smaller than the thickness variance of the at least one internal electrode layer 12". Next, using measured values of the thickness of the at least one dielectric layer 10 measured from 100 or more positions and measured values of the thickness of the at least one internal electrode layer 12 measured from 100 or more positions, the one-tailed F-test at a significance level of 0.05 is carried out to calculate p-value. When the p-value is smaller than 0.05, the null hypothesis can be rejected. That is, the alternative hypothesis of "the thickness variance of the at least one dielectric layer 10 is smaller than the thickness variance of the at least one internal electrode layer 12" is accepted. Because of the one-tailed F-test, when the alternative hypothesis of "the thickness variance of the at least one dielectric layer 10 is smaller than the thickness variance of the at least one internal electrode layer 12" is accepted, it can be said that "the thickness variance of the at least one dielectric layer 10 is statistically significantly smaller than the thickness variance of the at least one internal electrode layer 12".

In the present embodiment, an average thickness (ATe) of the internal electrode layers 12 is preferably thicker than an average thickness (ATd) of the dielectric layers 10. More preferably, a ratio (ATe/ATd) which is a ratio of the average thickness (ATe) of the internal electrode layers 12 with respect to the average thickness (ATd) of the dielectric layers 10 is within a range of 1.02 or more and 1.16 or less.

In the present embodiment, the average thickness ATd of the dielectric layers 10 is preferably 0.6 μm or less. The lower limit of the average thickness ATd of the dielectric layers 10 is not particularly limited, and for example it may be 0.3 μm. In the present embodiment, because the thickness variation of the internal electrode layers 12 is preferably larger than the thickness variation of the dielectric layers 10, even when the dielectric layers 10 are thinned, a crack formation can be suppressed, and also a capacitance can be increased.

In the present embodiment, the average thickness ATe of the internal electrode layers 12 is preferably 0.65 μm or less. The lower limit of the average thickness ATe of the internal electrode layers 12 is not particularly limited, and for example it may be 0.4 μm.

In the present embodiment, a thickness of a dielectric layer 10 selected from the at least one dielectric layer 10 and a thickness of an internal electrode layer 12 selected from the at least one internal electrode layer 12 which is adjacent to said dielectric layer 10 in a stacking direction (Z-axis direction) preferably have a negative correlation. This is explained using FIG. 2.

As shown in FIG. 2, a cross section of the multilayer ceramic capacitor 2 parallel to a stacking direction (Z-axis direction) is obtained; then, virtual lines L which are parallel to the stacking direction (Z-axis direction) are drawn. A distance d between the adjacent virtual lines L is preferably within a range of 0.5 μm or more and 1 μm or less. Also, the distance d between the adjacent virtual lines L is preferably larger than a particle size of a dielectric particle.

Next, a thickness Tda of a dielectric layer 10 on one virtual line L is measured, and also a thickness Tea of an internal electrode layer 12 which is on the same virtual line L and adjacent to said thickness Tda of said dielectric layer 10 in the stacking direction (Z-axis direction) is measured.

In other words, "a thickness Tea of an internal electrode layer 12 which is on the same virtual line L and adjacent to said thickness Tda of said dielectric layer 10 in the stacking direction (Z-axis direction)" means "a thickness Tea of an internal electrode layer 12 adjacent to said thickness Tda of said dielectric layer 10 in stacking direction (Z-axis direction)".

Similarly, a thickness Tdb of other dielectric layer 10 on other virtual line L is measured, and also a thickness Teb of other internal electrode layer 12 on the same virtual line and adjacent to said thickness Tdb of said other dielectric layer 10 in the stacking direction (Z-axis direction) is measured. This procedure is carried out to 100 positions or more. That is, "the thickness of the dielectric layer 10 selected from the at least one dielectric layer 10" is measured from 100 positions or more; and similarly, "the thickness of the internal electrode layer 12 selected from the at least one internal electrode layer 12" is measured from 100 positions or more.

In the present embodiment, the thickness of the dielectric layer 10 selected from the at least one dielectric layer 10 and the thickness of the internal electrode layer 12 selected from the at least one internal electrode layer 12 which is adjacent to said dielectric layer 10 in a stacking direction have a negative correlation. Here, "the thickness of the dielectric layer 10 selected from the at least one dielectric layer 10 and the thickness of the internal electrode layer 12 selected from the at least one internal electrode layer 12 which is adjacent to said dielectric layer 10 in a stacking direction have a negative correlation" can be explained as described in below using FIG. 3.

Figure 3:
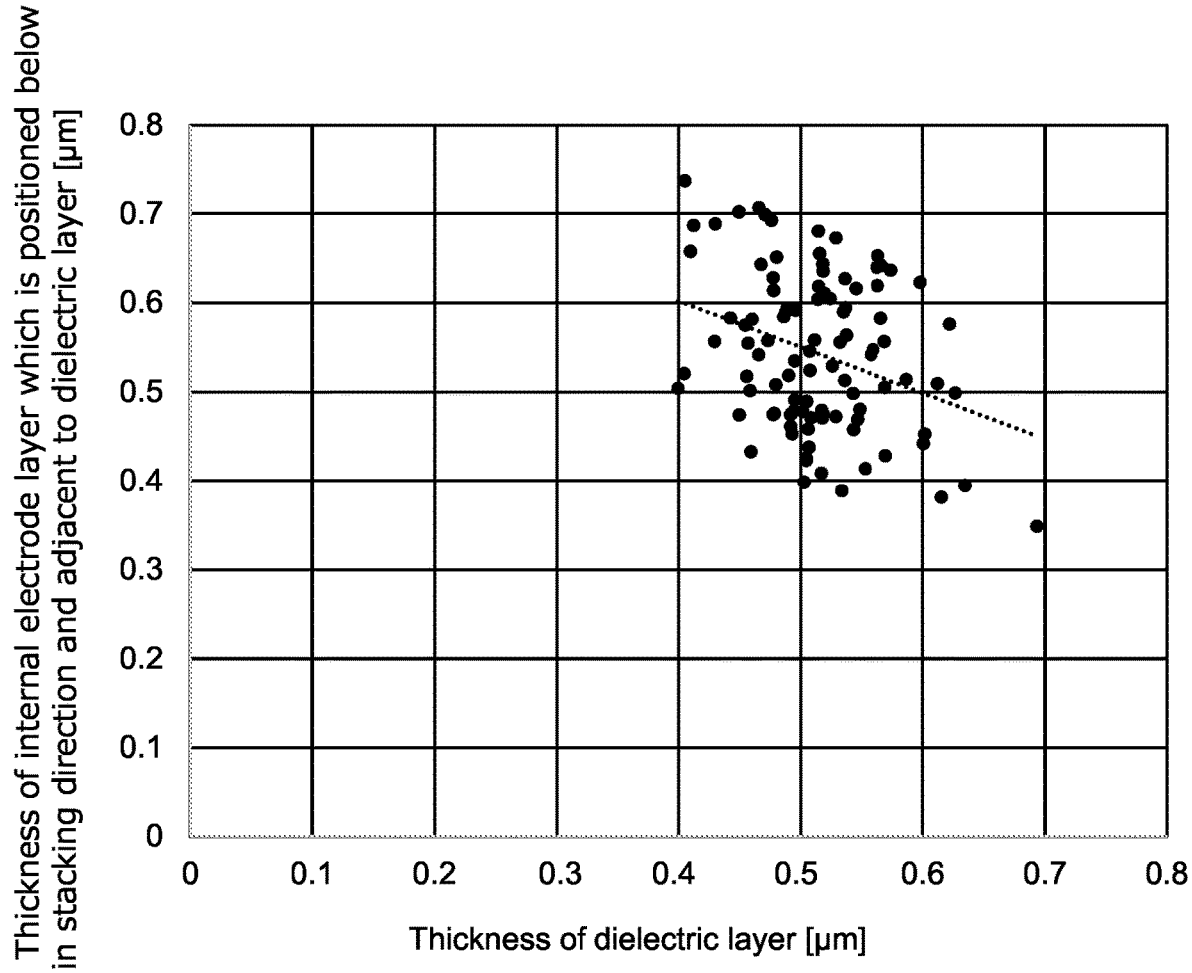
FIG. 3 is a scattered plot relating to an example of the present disclosure.

In the scattered plot shown in FIG. 3, the horizontal axis shows a thickness of at least one of dielectric layer 10, and the vertical axis shows a thickness of at least one of internal electrode layer 12 which contact with said dielectric layer 10 in a stacking direction (Z-axis direction). In the present embodiment, the scattered plot obtained as such shows a negative correlation.

A method of verifying the negative correlation of the scattered plot is not particularly limited, and for example a one-tailed test of Pearson product moment correlation coefficient at a significance level of 0.05 is performed, preferably a negative correlation is accepted when the p-value is less than 0.05. When a significance level is 0.05 and the p-value is less than 0.05, a null-hypothesis of "Pearson product moment correlation coefficient is 0" is rejected, and an alternative hypothesis of "Pearson product moment correlation coefficient is negative" is accepted, thereby the scattered plot is considered to have a negative correlation.

In the present embodiment, a coating ratio of the internal electrode layers 12 is preferably 85% or more, and more preferably 95% or more. The internal electrode layers 12 shown in FIG. 1 and FIG. 2 appear continuous in Y-axis direction, however in reality, when a cross section of the internal electrode layers 12 is observed, some of the internal electrode layers may have discontinuous parts. The discontinuous parts in the internal electrode layers 12 observed in the cross section do not have problem in terms of a functionality of the internal electrode layers 12 because the internal electrode layers 12 are continuous in other cross sections. The coating ratio of the internal electrode layers 12 is a value (%) which is obtained by dividing a total length of the electrodes excluding the discontinuous parts with an ideal continuous length of electrode.

Method of Producing Multilayer Ceramic Capacitor

Next, a method of producing the multilayer ceramic capacitor 2 as an embodiment of the present invention is described.

First, a dielectric layer paste is prepared to produce a green sheet which will form the dielectric layers 10 shown in FIG. 1 after sintering.

The dielectric layer paste is constituted by a water-based paste or an organic solvent-based paste which is usually obtained by kneading a ceramic powder and an organic vehicle.

Raw materials of the ceramic powder may be selected appropriately from various compounds such as oxides or composite oxides which will constitute the above-described dielectric layers 10; for example, carbonates, nitrates, hydroxides, organometallic compounds, and the like. In the present embodiment, the raw materials of the ceramic powder are used as a powder preferably having an average particle size of 0.01 to 1 μm or so. Note that, in order to obtain an extremely thin green sheet, preferably a powder having a smaller size than a thickness of the green sheet is used.

The organic vehicle is obtained by dissolving a binder in an organic solvent. The binder used for the organic vehicle is not specifically limited, and it may be appropriately selected from normally used various binders such as butyral, acrylic, ethyl cellulose, and the like.

Also, the used organic solvent is not particularly limited, and it may be selected appropriately from various organic solvents such as terpineol, butyl carbitol, alcohol, methyl ethyl ketone, acetone, toluene, and the like depending on the method to be used such as a printing method, a sheet method, and the like.

In the dielectric layer paste, if necessary, additives selected from various dispersants, plasticizers, dielectrics, subcomponent compounds, glass frits, and the like may be included.

As the plasticizers, for example, phthalates such as dioctyl phthalate, benzylbutyl phthalate, and the like; adipic acids, phosphoric esters, glycols, and the like may be mentioned.

Next, an internal electrode layer paste for forming the internal electrode layers 12 shown in FIG. 1 is prepared. The internal electrode layer paste is prepared by kneading the above-mentioned organic vehicle and a conductive material made of above-mentioned various conductive metals or alloys. Instead of the conductive material, oxides, organometal compounds, resinates, and the like can be used as well. The above-mentioned oxides, organometal compounds, and resinates become the above-mentioned conductive material after sintering. Note that, in the internal electrode layer paste, depending on needs, a ceramic powder (for example, barium titanate powder) may be included as a sintering inhibitor. The sintering inhibitor functions to suppress sintering of the conductive powder during a sintering step.

Figure 4:
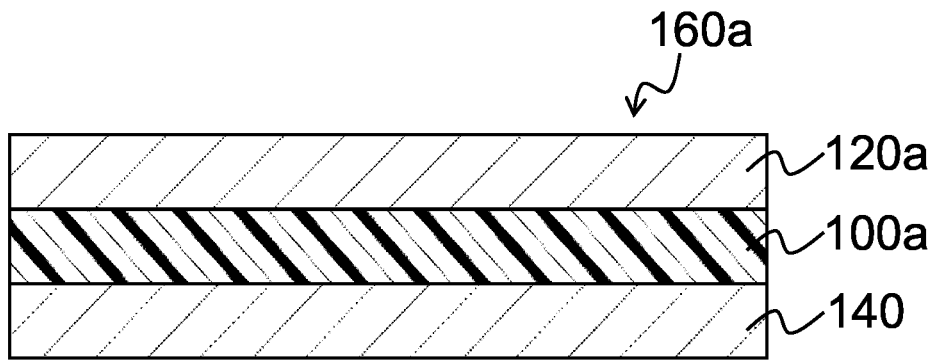
FIG. 4 is a diagram explaining a method of producing the multilayer ceramic capacitor according to an embodiment of the present disclosure.

By using the dielectric layer paste and the internal electrode layer paste prepared in above, a green sheet 100a which becomes the dielectric layer 10 after sintering is formed as shown in FIG. 4. A method of forming the green sheet 100a is not particularly limited, and for example, a printing method, a sheet method, and the like can be used. Note that, in the present embodiment and embodiments described below, even when a printing method is employed, a dielectric layer 10 before sintering is referred as "a green sheet".

In the present embodiment, the green sheet 100a is formed and dried on a support 140 such as PET film and the like.

Next, the internal electrode layer paste 120a which becomes the internal electrode layers 12 after sintering is formed on the green sheet 100a. A method of forming the internal electrode layer 120a is not particularly limited, and for example, a printing method, a transfer method, a sheet method, and the like can be used.

After forming the internal electrode layer paste 120a on the green sheet 100a, the internal electrode layer paste 120a is dried at an atmosphere temperature of Ta° C. to prepare a first sheet body 160a. The atmosphere temperature Ta° C. is preferably within a range of 70° C. or more and 100° C. or less, and more preferably within a range of 70° C. or more and 80° C. or less.

Figure 5:
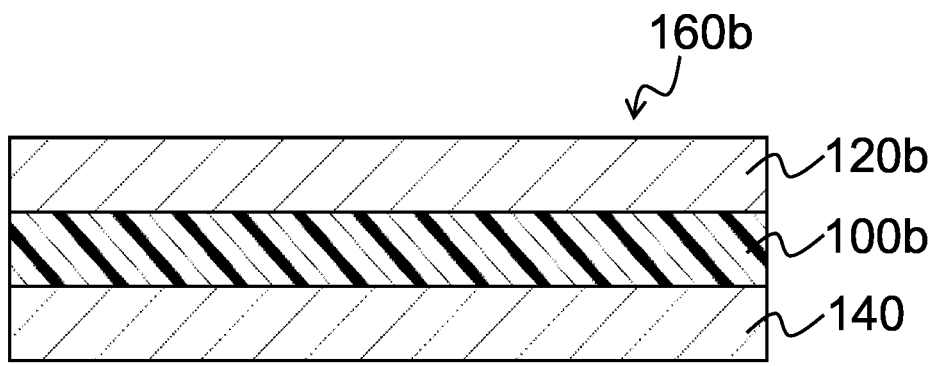
FIG. 5 is a diagram explaining a method of producing the multilayer ceramic capacitor according to an embodiment of the present disclosure.

Next, as shown in FIG. 5, a green sheet 100b is formed and dried on the support 140.

Next, after forming the internal electrode layer paste 120b on the green sheet 100b, the internal electrode layer paste 120b is dried at an atmosphere temperature of Tb° C. which is a temperature lower than Ta° C.

Preferably, (Ta–Tb)° C. is within a range of 5° C. or more and 30° C. or less, and more preferably within a range of 5° C. or more and 25° C. or less.

The first sheet body 160a and the second sheet body 160b are stacked alternatingly in a plurality of layers, thereby the green multilayer body is obtained.

In the present embodiment, preferably, the green sheet 100a of the first sheet body 160a has a higher Young's modulus than the green sheet 100b of the second sheet body 160b; and the internal electrode pattern layer 120a of the first sheet body 160a has a higher Young's modulus than the internal electrode pattern layer 120b of the second sheet body 160b.

Specifically, a drying temperature (Ta° C.) of the green sheet 100a and the internal electrode pattern layer 120a constituting the first sheet body 160a is set higher than a drying temperature (Tb° C.) of the green sheet 100b and the internal electrode pattern layer 120b constituting the second sheet body 160b, thereby the Young's modulus of the green sheet 100a of the first sheet body 160a is made higher than the Young's modulus of the green sheet 100b of the second sheet body 160b, the Youngs' modulus of the internal electrode pattern layer 120a of the first sheet body 160a is made higher than the Young's modulus of the internal electrode pattern layer 120b of the second sheet body 160b.

In the present embodiment, the Young's moduli of the green sheet 100a and the internal electrode pattern layer 120a constituting the first sheet body 160a, and the Young's moduli of the green sheet 100b and the internal electrode pattern layer 120b constituting the second sheet body 160b satisfy the relation shown in below.

Green sheet 100b<Green sheet 100a<Internal electrode pattern layer 120b<Internal electrode pattern layer 120a The obtained green multilayer body, for example, may be cut into a predetermined size along a cutting line to produce green chips. The plasticizer is removed by solid drying; thereby the green chips are solidified. The green chips after solid drying are placed in a barrel container together with media and polishing liquid, and barrel polishing is performed using a horizontal centrifugal barrel machine and the like. After barrel polishing, the green chips are washed with water and then dried.

The dried green chips may be performed with a binder removing step and a sintering step, and also, if needed, an annealing step may be performed, thereby the element body 4 shown in FIG. 1 can be obtained.

As binder removing conditions, a temperature increasing rate is preferably 5 to 300° C./hour, a holding temperature is preferably 180 to 400° C., and a temperature holding time is preferably 0.5 to 24 hours. Also, a binder removal atmosphere is in the air or in reduced atmosphere.

When the green chips are sintered, a temperature rising rate is preferably 10 to 800° C./hour, and more preferably it is 30 to 500° C./hour.

A holding temperature while sintering the green chips is preferably 1150 to 1350° C., and more preferably 1200 to 1300° C., and a temperature holding time is preferably 0.5 to 8 hours, and more preferably 2 to 3 hours.

A sintering atmosphere is preferably reduced atmosphere, and as atmosphere gas, for example, a humidified mixed gas of $N_2$ and $H_2$ may be used.

Also, the oxygen partial pressure while sintering may be determined depending on the type of the conductive material in the internal electrode layer paste, and when base metals such as Ni, Ni alloy, and the like are used as the conductive material, the oxygen partial pressure in the sintering atmosphere is preferably within a range of $10^{-14}$ to $10^{-10}$ MPa.

After the green chips are sintered in the reduced atmosphere, annealing is preferably performed to the element body 4. Annealing is a process to re-oxidize the dielectric layers 10, and thereby IR lifetime (highly accelerated lifetime) can be extended significantly, thus the reliability improves.

The oxygen partial pressure in the annealing atmosphere is preferably within a range of $10^{-9}$ to $10^{-5}$ MPa. By making the oxygen partial pressure to $10^{-9}$ MPa or higher, the dielectric layers 10 can be efficiently re-oxidized easily.

A holding temperature while annealing is preferably within a range of 950 to 1150° C. By making the holding temperature to 950° C. or higher, the dielectric layers 10 can be thoroughly oxidized easily, and IR (insulation resistance) and IR lifetime can be improved easily.

As annealing conditions other than mentioned in above, a temperature holding time is preferably within a range of 0 to 20 hours, and a temperature decreasing rate is preferably within a range of 50 to 500° C./hour. Also, as atmosphere gas during annealing, for example, a humidified $N_2$ gas and the like may be preferably used.

During the binder removal treatment, sintering, and annealing as mentioned in above, in order to humidify $N_2$ gas, mixed gas, and the like, for example, a wetter and the like may be used. In this case, the water temperature is preferably within a range of 5 to 75° C.

The binder removal treatment, sintering, and annealing may be performed continuously or may be performed independently.

The sintered body (element body 4) obtained as such is performed with an edge polishing by a barrel polishing and the like, and a terminal electrode paste is sintered to form the first terminal electrode 6 and the second terminal electrode 8. Then, if necessary, the first terminal electrode 6 and the second terminal electrode 8 are plated to form a pad layer thereon. Note that, the terminal electrode paste may be prepared as same as the above-mentioned internal electrode layer paste.

The multilayer ceramic capacitor 2 produced as such is mounted on a print board and the like by soldering and the like, then used as various electronic devices.

In the present embodiment, even when the multilayer ceramic capacitor 2 is made thinner, a good reliability is attained and a crack formation is suppressed, and also a capacitance can be increased. The reason for this is speculated as described in below. In the multilayer ceramic capacitor of the present embodiment, the thickness variation of the internal electrode layers 12 is larger than the thickness variation of the dielectric layers 10, hence a contact area between the dielectric layers 10 and the internal electrode layers 12 is increased. Therefore, a crack formation is suppressed, and a capacitance can be increased. Also, since the thickness variation of the dielectric layers 10 is small, a good reliability can be attained.

Further, in the present embodiment, since the coating ratio of the internal electrode layers 12 is relatively high, the contact area between the dielectric layers 10 and the internal electrode layers 12 is large. Thus, a crack formation is suppressed, and also a capacitance can be increased.

In the present embodiment, the Young's moduli of the dried green sheet 100a and the internal electrode pattern layer 120a of the first sheet body 160a, and the Young's moduli of the green sheet 100b and the internal electrode pattern layer 120b of the second sheet body 160b are as shown in below.

Green sheet 100b<Green sheet 100a<Internal electrode pattern layer 120b<Internal electrode pattern layer 120a As the Young's moduli satisfy the above relation, the internal electrode pattern layer 120a constituting the first sheet body 160a is relatively hard, thus the internal electrode pattern layer tends to have a thickness variation. Also, the green sheet 100b and the internal electrode pattern layer 120b constituting the second sheet body 160b are relatively flexible, the thickness variation of the internal electrode pattern layer 120a constituting the first sheet body 160a is absorbed. As a result, a predetermined thickness variation is formed to the sintered dielectric layers 10 and also a predetermined thickness variation is formed to the sintered internal electrode layers 12.

Note that, after the first sheet body 160a is dried, it may be rolled. The internal electrode pattern layer 120a constituting the first sheet body 160a has a thickness variation. Since the Young's modulus of the green sheet 100a is lower than the Young's modulus of the internal electrode pattern layer 120a, by rolling the first body 160a, the thickness variation of the internal electrode pattern layer 120a is reflected to the green sheet 100a. As a result, not only the green sheet 100b of the second sheet body 160b, a predetermined thickness variation is also formed to the green sheet 100a of the first sheet body 160a.

Second Embodiment

The present embodiment is the same as the first embodiment except for described in below. In the present embodiment, by changing a viscosity of a binder constituting the internal electrode pattern layer, the Young's modulus of the internal electrode pattern layer is changed. As a result, a predetermined thickness variation is formed to the sintered dielectric layers 10 and also a predetermined thickness variation is formed to the sintered internal electrode layers 12.

Figure 6:
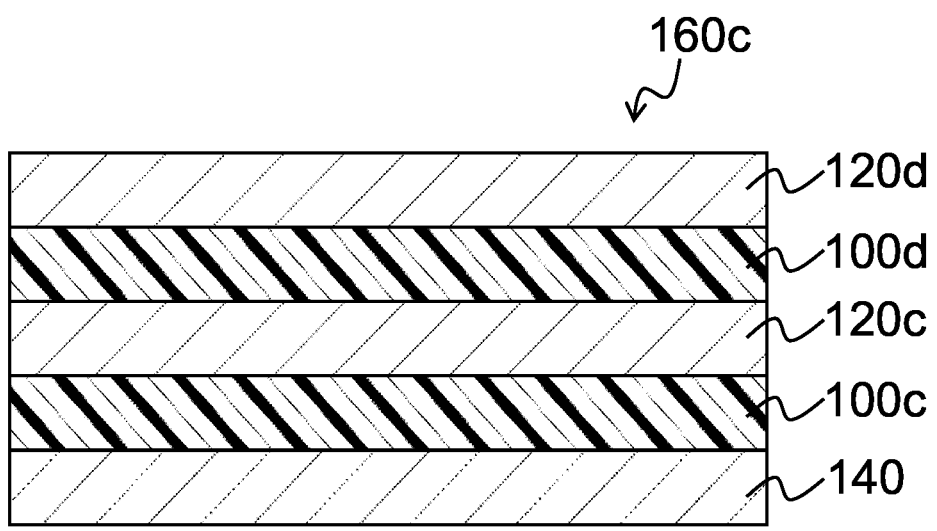
FIG. 6 is a diagram explaining a method of producing the multilayer ceramic capacitor according to an embodiment of the present disclosure.

In the present embodiment, as shown in FIG. 6, a green sheet 100c is formed on a support 140, and then dried. Then, an internal electrode pattern layer 120c is formed on the green sheet 100c, and then dried. Next, a green sheet 100d is formed on the internal electrode pattern layer 120c.

Next, an internal electrode layer paste is prepared by using a binder having a lower viscosity than the binder included in the internal electrode pattern layer 100c to form an internal electrode pattern layer 120d on the green sheet 100d, and then dried to obtain a sheet body 160c.

The green sheet 100c, the internal electrode pattern layer 120c, the green sheet 100d, and the internal electrode pattern layer 120d may be dried at the same or different temperature. Preferably, the drying temperatures of the green sheet 100d and the internal electrode pattern layer 120d are lower than the drying temperatures of the green sheet 100c and the internal electrode pattern layer 120c.

For example, when ethylcellulose is used as a binder, a molecular weight of ethylcellulose included in the internal electrode pattern layer 100c is 120000 to 170000, and a molecular weight of ethylcellulose included in the internal electrode pattern layer 100d is 70000 to 120000. Thereby, the viscosity of the binder included in the internal electrode pattern layer 100d can be made lower than the viscosity of the internal electrode pattern layer 100c.

In the present embodiment, the sheet body 160c is stacked in a plurality of layers to obtain the green multilayer body.

In the present embodiment, by making a viscosity of a binder of the internal electrode pattern layer 120c higher than a viscosity of a binder of the internal electrode pattern layer 120d, the Young's modulus of the internal electrode pattern layer 120c can be made higher than the Young's modulus of the internal electrode pattern layer 120d.

In the present embodiment, the relation of the Young's moduli are preferably as described in below.

Green sheet 100c≈Green sheet 100d<Internal electrode pattern layer 120d<Internal electrode pattern layer 120c As the Young's moduli satisfy the above relation, because the internal electrode pattern layer 120c is relatively hard, a thickness variation tends to occur easily to the internal electrode pattern layer 120c. Also, since the green sheet 100d and the internal electrode pattern layer 120d are relatively flexible, the thickness variation of the internal electrode pattern layer 120c is absorbed by the green sheet 100d and the internal electrode pattern layer 120d. As a result, a predetermined thickness variation is formed to the sintered dielectric layers 10 and also a predetermined thickness variation is formed to the sintered internal electrode layers 12.

Note that, in the present embodiment, the green sheet 100c, the internal electrode pattern layer 120c, the green sheet 100d, and the internal electrode pattern layer 120d are overcoated, a binder used in the dielectric layer paste is preferably an acrylic resin. Thereby, the resin in a lower layer of the green sheet which is formed by the dielectric layer paste is rarely dissolved.

Third Embodiment

The present embodiment is the same as the first embodiment except for described in below. In the present embodiment, a predetermined thickness variation of the dielectric layers 10 and a predetermined thickness variation of the internal electrode layers 12 are formed by rolling the internal electrode pattern layer.

As shown in FIG. 4, the green sheet 100a is formed on the support 140, and then dried. Next, the internal electrode pattern layer 120a is formed on the green sheet 100a and dried to produce the first sheet body 160a. Next, the first sheet body is rolled, and then the rolled first sheet body 160a is stacked in a plurality of layers to obtain the green multilayer body.

The green sheet 100a and the internal electrode pattern layer 120a may be dried at the same or different drying temperature.

In the present embodiment, the Young's moduli preferably satisfy the below relation.

Green sheet 100a<Internal electrode pattern layer 120a

As the Young's moduli satisfy the above relation, because the internal electrode pattern layer 120a is relatively hard, a thickness variation of the internal electrode pattern layer 120a tends to occur easily. Also, since the green sheet 100a is relatively flexible, the thickness variation of the internal electrode pattern layer 120a is absorbed by rolling. As a result, a predetermined thickness variation is formed to the sintered dielectric layers 10 and also a predetermined thickness variation is formed to the sintered internal electrode layers 12.

Fourth Embodiment

The present embodiment is the same as the first embodiment except for described in below. In the present embodiment, the internal electrode pattern layer includes carbon, thereby a predetermined thickness variation of the dielectric layers 10 and a predetermined thickness variation of the internal electrode layers 12 are formed.

In the present embodiment, as shown in FIG. 4, the green sheet 100a is formed on the support 140, and then dried.

In the present embodiment, an internal electrode layer paste including carbon is used as the internal electrode layer paste. An added amount of carbon in the internal electrode layer paste is preferably 0.1 to 2 mass %, and more preferably 0.3 to 1 mass % of the entire amount of the internal electrode layer paste.

Next, an internal electrode pattern layer 120a including carbon is formed on the green sheet 100a, and dried to produce the first sheet body 160a.

The green sheet 100a and the internal electrode pattern layer 120a may be dried at the same or different drying temperature.

The first sheet body 160a is stacked in a plurality of layers to obtain the green multilayer body.

Note that, a temperature increasing rate during a sintering step of the present embodiment is within a range of preferably 10 to 800° C./hour. By making the temperature increasing rate of the sintering step relatively slow, Ba—Ti—Ni alloy having a low melting point tends to be formed easily at interfaces between the internal electrode layers 12 and the dielectric layers 10, and the thickness variation of internal electrode layers 12 can be increased.

In the present embodiment, by including carbon in the internal electrode pattern layer 120a, the Ba—Ti—Ni alloy having a low melting point tends to be formed easily between interfaces of the internal electrode layers 12 and the dielectric layers 10, which causes the thickness variation of the internal electrode layers 12. As a result, a predetermined thickness variation is formed to the sintered internal electrode layers 12.

Fifth Embodiment

The present embodiment is the same as the second embodiment except for described in below. In the present embodiment, by changing a viscosity of the internal electrode layer paste, the Young's modulus is changed. As a result, a predetermined thickness variation of the dielectric layers 10 and a predetermined thickness variation of the internal electrode layers 12 are formed.

In the present embodiment, as shown in FIG. 6, the green sheet 100c is formed on the support 140, and then dried. Next, the internal electrode pattern layer 120c is formed on the green sheet 100c, and then dried. Next, the green sheet 100d is formed on the internal electrode pattern layer 120c, and then dried.

Next, an internal electrode layer paste is prepared by using an internal electrode layer paste having a lower viscosity than the one used for forming the internal electrode pattern layer 100c. Thereby, the internal electrode pattern layer 120d is formed on the green sheet 100d, and then dried to obtain the sheet body 160c.

The green sheet 100c, the internal electrode pattern layer 120c, the green sheet 100d, and the internal electrode pattern layer 120d may be dried at the same or different drying temperature; and preferably the drying temperatures of the green sheet 100d and the internal electrode pattern layer 120d are lower than the drying temperatures of the green sheet 100c and the internal electrode pattern layer 120c.

As a method of adjusting the viscosity of the internal electrode layer paste, a method of adjusting an amount of solvent and binder, a method of adjusting a viscosity of the binder by changing the type of binder and a degree of polymerization (molecular weight) may be mentioned.

Note that, in the present embodiment, the viscosity of the dielectric layer paste used for the green sheet 100c and the green sheet 100d is preferably 20 to 100 cP at a rotational speed of 100 rpm.

The viscosity of the internal electrode layer paste used for the internal electrode pattern layer 120c and the internal electrode pattern layer 120d is preferably $3\times10^3$ to $2\times10^4$ cP at a rotational speed of 100 rpm.

In the present embodiment, the sheet body 160c is stacked in a plurality of layers to obtain the green multilayer body.

In the present embodiment, the viscosity of the internal electrode layer paste constituting the internal electrode pattern layer 120c is higher than the viscosity of the internal electrode layer paste constituting the internal electrode pattern layer 120d.

In the present embodiment, the relation of the viscosities are preferably as described in below.

Dielectric layer paste constituting green sheet 100c≈Dielectric layer paste constituting green sheet 100d<Internal electrode layer paste constituting internal electrode pattern layer 120d<Internal electrode layer paste constituting internal electrode pattern layer 120c As the viscosities satisfy the above-described relation, because the internal electrode pattern layer 120c is relatively hard, the internal electrode pattern layer 120c tends to easily have a thickness variation. Also, since the green sheet 100d and the internal electrode pattern layer 120d are relatively flexible, the thickness variation of the internal electrode pattern layer 120c is absorbed by the green sheet 100d and the internal electrode pattern layer 120d. As a result, a predetermined thickness variation of the dielectric layers 10 and a predetermined thickness variation of the internal electrode layers 12 are formed.

Sixth Embodiment

The present embodiment is the same as the first embodiment except for described in below. In the present embodiment, by using a conductive material having a variation in particle size distribution as a conductive material included in the internal electrode pattern layer, a predetermined thickness variation of the dielectric layers 10 and a predetermined thickness variation of the internal electrode layers 12 are formed.

In the present embodiment, as the conductive material included in the internal electrode layer paste, a conductive material having a variation in a particle size distribution is used. Specifically, the conductive material having (D90−D10) is preferably within a range of 0.01 μm or more and 1 μm or less, and more preferably 0.05 μm or more and 0.5 μm or less is used.

In the present embodiment, the particle size distribution of the conductive material included in the internal electrode pattern layer 120a has a variation, in other words, the conductive material included in the internal electrode pattern layer 120a has a broad particle size distribution. Therefore, the thickness variation of the internal electrode pattern layer 120a and the thickness variation of the internal electrode pattern layer 120b can be formed. Also, the Young's moduli of the green sheet 100a and the green sheet 100b are lower than the Young's moduli of the internal electrode pattern layer 120a and the internal electrode pattern layer 120b, thus due to the influence of the thickness variations of the internal electrode pattern layer 120a and the internal electrode pattern layer 120b, the thickness variations of the green sheet 100a and the green sheet 100b are formed as well. Particularly, when the first sheet and the second sheet are both rolled, the thickness variations of the green sheet 100a and the green sheet 100b become more prominent. As a result, a predetermined thickness variation of the sintered dielectric layers 10 and a predetermined thickness variation of the sintered internal electrode layers 12 are formed.

Note that, the present disclosure is not limited to the above-mentioned embodiment, and various modifications may be done within the scope of the present disclosure.

For example, the multilayer electronic component of the present disclosure is not limited to the multilayer ceramic capacitor, and it can be used for other multilayer electronic components. Other multilayer electronic components include all types of electronic components in which at least one dielectric layer is stacked via at least one internal electrode layer; and for example, band-pass filters, multilayer 3-terminal filters, piezoelectric elements, PTC thermistors, NTC thermistors, varistors, and the like may be mentioned.

Also, in the above-mentioned embodiments, by increasing the drying temperature, the Young's modulus is increased, and by decreasing the drying temperature, the Young's modulus is decreased; however, the Young's modulus can be increased by taking longer drying time, and the Young's modulus can be decreased by shortening the drying time.

Examples

Hereinafter, the present disclosure is described in further details using examples of the present disclosure, however the present disclosure is not limited thereto.
<Sample Nos. 3 to 5>

As a raw material powder of a main raw material, $BaTiO_3$ powder was prepared. Next, to 100 mol of the main raw material, 1.27 mol of $SiO_2$ powder, 0.63 mol of MgO powder, 0.51 mol of $Y_2O_3$ powder, 0.16 mol of $MnCO_3$ powder, and 0.05 mol of $V_2O_5$ powder were weighed. These powders were wet mixed by a ball mill, then dried to obtain a dielectric raw material.

Next, the obtained dielectric raw material: 100 parts by mass, butyral resin: 7 parts by mass, dioctyl phthalate (DOP)

as a plasticizer: 4 parts by mass, methylethyl ketone as a solvent: 80 parts by mass, and high molecular weight polyester acid amido amine salt as a dispersant: 2 parts by mass were mixed using a ball mill to form a paste, thereby a dielectric layer paste was obtained.

Also, separately from mentioned in above, Ni particles: 56 parts by mass, terpineol: 40 parts by mass, ethylcellulose (a molecular weight of 140000):4 parts by mass, and benzotriazole: 1 part by mass were kneaded using a three-roll kneader to form a paste, thereby an internal electrode layer paste was produced.

Further, as shown in FIG. 4, using the dielectric layer paste produced in above, a green sheet 100a as a first layer was formed on a PET film as a support 140, and then it was dried.

Next, on the first layer of the green sheet 100a, using the internal electrode layer paste produced in above, an internal electrode pattern layer 120a as a second layer which becomes an internal electrode layer 12 after sintering was formed, and then dried at a temperature (Ta) described in Table 1, thereby a first sheet body 160a was prepared.

Next, using the dielectric layer paste produced in above, a green sheet 100b as a first layer was formed on the support 140 as show in FIG. 5, and then dried.

Next, on the green sheet 100b as the first layer, an internal electrode pattern layer 120b as a second layer which becomes an internal electrode layer 12 after sintering was formed using the internal electrode layer paste produced in above, and then it was dried at the temperature (Tb) shown in Table 1, thereby a second sheet body 160b was prepared.

The first sheet body 160a and the second sheet body 160b are stacked alternatingly in a plurality of layers to obtain a green multilayer body.

Young's moduli of the green sheet 100a as the first layer and the internal electrode pattern layer 120a as the second layer in the first sheet body 160a, and Young's moduli of the green sheet 100b as the first layer and the internal electrode pattern layer 120b as the second layer in the second sheet body 160b were as shown in Table 1.

The obtained green multilayer body was cut in a predetermined size along a cutting line, thereby green chips were obtained. The green chips were solid dried, barrel polished, washed with water, and dried.

Next, the obtained green chips were performed with a binder removal treatment, sintering, and annealing under the below conditions, thereby a sintered body (element body) was obtained.

Conditions of the binder removal treatment were a temperature increasing rate: 200° C./hour, a holding temperature: 260° C., a holding time: 8 hours, and atmosphere: in the air.

Sintering conditions were a temperature increasing rate: 200° C./hour, a holding temperature: 1000° C., and a holding time: 120 minutes. A temperature decreasing rate: 200° C./hour. Note that, an atmosphere gas was a humidified gas of $N_2+H_2$ mixture, and an oxygen partial pressure was set to $10^{-9}$ MPa or less.

Annealing conditions were a temperature increasing rate: 200° C./hour, a holding temperature: 1000° C., a holding time: 10 hours, a temperature decreasing rate: 200° C./hour, and an atmosphere gas: a humidified gas of $N_2+H_2$ mixture (oxygen partial pressure of $10^{-8}$ MPa or less).

Note that, for humidifying the atmosphere gas during sintering and annealing, a wetter was used.

Next, after carrying out barrel polishing to the obtained sintered body, a Cu paste was coated as a terminal electrode, and then a baking treatment was performed under a reducing atmosphere, thereby the multilayer ceramic capacitor samples according to Sample No. 3 to 5 were obtained (hereinafter, these may be simply referred as "capacitor samples").

Each obtained capacitor sample had a size of 0.6 mm×0.3 mm×0.3 mm, and the number of the dielectric layers 10 between the internal electrode layers 12 was 240.

The obtained capacitor sample was cut in parallel to the stacking direction. The obtained cross section was observed using a scanning electron microscope (SEM), and a plurality of virtual lines L were drawn as shown in FIG. 2. Distance between the adjacent virtual lines L was 5 μm.

Next, a thickness Tda of the dielectric layer 10 on the virtual line L was measured, and a thickness Tea of the internal electrode layer 12 which is below in a stacking direction (Z-axis direction) and adjacent to the measured thickness Tda of said dielectric layer 10. This process was performed to 100 positions.

Based on the thicknesses of the dielectric layers 10 and the thicknesses of the internal electrode layers 12 as described in above, each evaluation shown in Table 2 was calculated. Evaluations of "Dielectric $\sigma^2$ is statistically significantly smaller than electrode $\sigma^2$" and "Negative correlation statistically confirmed" were calculated as described in below.

Dielectric $\sigma^2$ is Statistically Significantly Smaller than Electrode $\sigma^2$ Based on the thicknesses of the dielectric layers 10 of 100 positions and the thicknesses of the internal electrode layers 12 of 100 positions measured as described in above, a one-tailed F-test was performed. In the one-tailed F-test, a null hypothesis of "a thickness variance of the dielectric layers 10 and a thickness variance of the internal electrode layers 12 are not different (homoscedastic)" was proposed. Next, an alternative hypothesis of "a thickness variance of the dielectric layers 10 is smaller than a thickness variance of the internal electrode layers 12" was proposed. Then, a one-tailed F-test of a significance level of 0.05 was performed using the measurement results of 100 positions or more of the thicknesses of the dielectric layers 10 and the measurement results of 100 positions or more of the thicknesses of the internal electrode layers 12, then a p-value was calculated. When the p-value was smaller than 0.05, the above-mentioned null hypothesis can be rejected. That is, the alternative hypothesis of "a thickness variance of the dielectric layers 10 is smaller than a thickness variance of the internal electrode layers 12" was accepted. Thus, when the alternative hypothesis of "a thickness variance of the dielectric layers 10 is smaller than a thickness variance of the internal electrode layers 12" was accepted by the one-tailed F-test, it was considered that "a thickness variance of the dielectric layers 10 (dielectric $\sigma^2$) is statistically significantly smaller than a thickness variance of the internal electrode layers 12 (electrode $\sigma^2$)".

Negative Correlation Statistically Confirmed

The thicknesses of the dielectric layers 10 were measured at 100 positions, and the thickness of the internal electrode layers 12 were measured at 100 positions as described in above were used to determine a negative correlation between a thickness of a dielectric layer 10 and a thickness of an internal electrode layer 12 which is adjacent in stacking direction to the thickness of said dielectric layer 10. Based on the measurement results of these, a one-tailed test of Pearson product moment correlation coefficient at a significance level of 0.05 was performed, and when the p-value was less than 0.05, a negative correlation was confirmed. When the significance level was 0.05 and the p-value was less than 0.05, a null hypothesis of "Pearson product moment correlation coefficient is 0" is rejected, and an alternative hypothesis of "Pearson product moment correlation coefficient is negative" was accepted. Thus, it can be said that a scattered plot has a negative correlation.

FIG. 3 is a scattered plot of Sample No. 3. In the scattered plot shown in FIG. 3, the horizontal axis shows a thickness of a dielectric layer 10, and the vertical axis shows a thickness of an internal electrode layer 12 which is positioned below in a stacking direction (Z-axis direction) and adjacent to said dielectric layer 10. Regarding Sample No. 3, not only from the one-tailed test of Pearson product moment correlation coefficient, but also from FIG. 3, a negative correlation between the thickness of the dielectric layer 10 and the thickness of the internal electrode layer 12 which is adjacent with the dielectric layer 10 in a stacking direction was confirmed.

Young's Modulus

In order to measure the Young's modulus of the green sheet, the dielectric layer paste was coated on the PET film, and then dried. Then, it was cut in a predetermined size, and the dielectric layer paste was released form the PET film to produce a sample for measuring the Young's modulus.

As shown in Sample Nos. 11 and 41 to 43 described in below, when the dielectric layer paste was overcoated, only one layer is coated on the PET film, and a thermal history which was the same as the drying temperature of the green sheet 100c as a first layer of Sample Nos. 11 and 41 to 43 was applied, and then dried. Then, it was cut into a predetermined size and the dried dielectric paste was released from the PET film to produce a sample for measuring the Young's modulus.

In order to measure the Young's modulus of the internal electrode pattern layer, the internal electrode paste was coated on the PET film, and the same thermal history as printing was applied, and then dried. Then, it was cut into a predetermined size, and the dried internal electrode paste was released from the PET film to produce a sample for measuring the Young's modulus.

The obtained sample for measuring the Young's modulus was pulled, and strain and stress while pulling were calculated.

Further, using the methods described in below, accelerated lifetime, breakdown voltage, the number of cracks of the obtained capacitor sample were measured. Results are shown in Table 2.

Accelerated Lifetime

Regarding each capacitor sample, a direct electric field of 5 V/μm was maintained at 160° C. to measure a lifetime, thereby an accelerated lifetime was evaluated. In the present examples, the above-mentioned evaluation was performed to 20 capacitor samples, and a time when an insulation resistance drops by one digit from the beginning of electric field application was defined as a breaking time, and an accelerated lifetime was defined from an average breaking time which was calculated from using a Weibull analysis to said breaking time.

Breakdown Voltage

Using a breakdown voltage measuring device, voltage which increased at a rate of 10 V/sec was continuously applied to a capacitor sample, and then the voltage when current of 10 mA flew was a defined as a breakdown voltage. A breakdown voltage was measured from twenty capacitor samples to obtain an average breakdown voltage. The obtained average breakdown voltage was divided by an average thickness of the dielectric layers of the capacitor samples to calculate an insulation breakdown voltage [V/μm].

Number of Cracks

A capacitor sample was mounted on a FR4 substrate (glass-epoxy substrate) using Sn—Ag—Cu solder, then it was placed in a pressure cooker to carry out an accelerated humidity test which was performed at 121° C. under atmosphere of 95% humidity for 100 hours. For each capacitor sample, 100 tests were performed. The number of capacitors having defects were shown as "the number of cracks" shown in Table 1.

<Sample No. 1>

In Sample No. 1, the second sheet body was not prepared, and the first sheet body was stacked in a plurality of layers to obtain the green multilayer body.

In Sample No. 1, the temperature increasing rate during the sintering step was changed as shown in Table 1.

Other than described in above, the capacitor sample was produced as same as Sample Nos. 3 to 5, and each evaluation was carried out. Results are shown in Table 1 and Table 2.

<Sample No. 2>

In Sample No. 2, the second sheet body was not prepared, and the first sheet body was stacked in a plurality of layers to obtain the green multilayer body.

Figure 7:
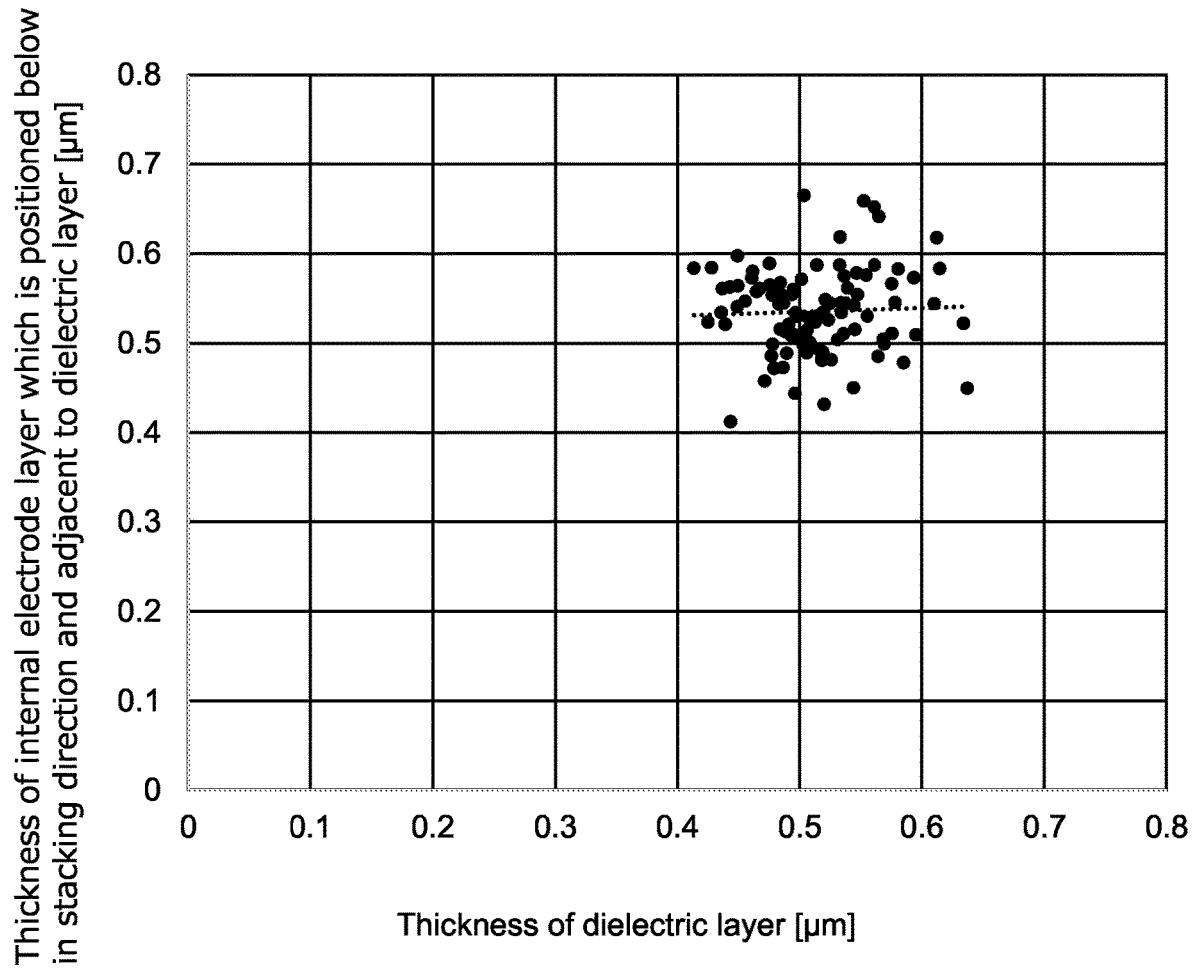
FIG. 7 is a scattered plot relating to a comparative example of the present disclosure.

Other than mentioned in above, the capacitor sample was produced as same as Sample Nos. 3 to 5, and each evaluation was carried out. Results are shown in Table 1 and Table 2. Also, a scattered plot of Sample No. 2 is shown in FIG. 7.

<Sample No. 11>

The dielectric raw material obtained as same as Sample Nos. 3 to 5:100 parts by mass, acrylic resin: 7 pats by mass, dioctyl phthalate (DOP) as a plasticizer: 4 parts by mass, methylethyl ketone as a solvent: 80 parts by mass, and high molecular weight polyester acid amido amine salt as a dispersant: 2 parts by mass were mixed to form a paste, and the dielectric layer paste for overcoating was obtained.

Also, other than mentioned in above, Ni particles: 56 parts by mass, terpineol: 40 parts by mass, ethylcellulose (a molecular weight of 140000):4 parts by mass, and benzotriazole: 1 part by mass were kneaded using a three-roll kneader to form a paste, and an internal electrode layer paste for second layer was produced.

Further, other than mentioned in above, Ni particles: 56 parts by mass, terpineol: 40 parts by mass, ethylcellulose (a molecular weight of 100000):4 parts by mass, and benzotriazole: 1 part by mass were kneaded using a three-roll kneader to form a paste, and an internal electrode layer paste for fourth layer was produced.

Using the above-produced dielectric layer paste for overcoating was coated on a PET film as a support 140 as shown in FIG. 6 to form the green sheet 100c as a first layer, and then dried. Next, using the above-produced internal electrode layer paste for second layer, the internal electrode pattern layer 120c as a second layer was formed on the green sheet 100c as a first layer, and then dried. Next, the above-produced the dielectric layer paste for overcoating was coated on the internal electrode pattern layer 120c as the second layer to form the green sheet 100d as a third layer, and then dried.

Next, using the above-produced internal electrode layer paste for fourth layer, the internal electrode pattern layer 120d as the fourth layer was formed on the green sheet 100d as the third layer, and then dried to obtain the sheet body 160c. Then, the sheet body 160c was stacked in a plurality of layers to obtain the green multilayer body.

Besides mentioned in above, the capacitor sample was produced as same as Sample Nos. 3 to 5, and each evaluation was carried out. Results are shown in Table 3 and Table 4.

<Sample No. 21>

In Sample No. 21, the capacitor sample was produced as same as Sample No. 2 except for rolling was performed to the first sheet body, and each evaluation was carried out. Results are shown in Table 5 and Table 6.

<Sample No. 31>

In Sample No. 31, with respect to entire amount of the internal electrode layer paste, 0.5 mass % of carbon was added.

Besides mentioned in above, the capacitor sample was produced as same as Sample No. 2, and each evaluation was carried out. Results are shown in Table 7 and Table 8.

<Sample No. 41 to 43>

In Sample No. 41 to 43, the added amount of the solvent and the type of the binder were changed in order to change viscosities of the dielectric layer paste constituting the green sheet as a first layer, the internal electrode layer paste constituting the internal electrode pattern layer as a second layer, the dielectric layer paste constituting the green sheet as a third layer, and the internal electrode layer paste constituting the internal electrode pattern layer as a fourth layer. The capacitor sample was produced as same as Sample No. 11, other than changing the viscosity of each layer as shown in Table 9, and each evaluation was carried out. Results are shown in Table 9 and Table 10.

<Sample No. 51>

In Sample No. 51, the capacitor sample was produced as same as Sample No. 3 and each evaluation was carried out except that in the internal electrode layer paste, 5 parts by mass of a $BaTiO_3$ powder having a particle size of 0.5 μm was added to 100 parts by mass of a nickel powder. Results are shown in Table 11 and Table 12.

<Sample Nos. 61 and 62>

In Sample Nos. 61 and 62, the capacitor sample was produced as same as Sample No. 3 and each evaluation was carried out except that a particle size variation (D90–D10) of the conductive material included in the internal electrode layer paste was changed as shown in Table 13. Results are shown in Table 13 and Table 14. Note that, for each sample shown in Table 14, a test for evaluating the number of cracks were performed to 1000 capacitor samples.

TABLE 1

| | | Young's modulus [GPa] | | | Drying Temp of internal electrode pattern layer of first sheet body (Ta) [° C.] | Drying Temp of internal electrode pattern layer of second sheet body (Tb) [° C.] | Temp increasing rate [° C./h] |
|---|---|---|---|---|---|---|---|
| | First sheet body | | Second sheet body | | | | |
| Sample No. | Green sheet as first layer | Internal electrode pattern layer as second layer | Green sheet as first layer | Internal electrode pattern layer as second layer | | | |
| 1 | 0.2 | 4.6 | | | 80 | | 1000 |
| 2 | 0.4 | 2.6 | | | 80 | | 200 |
| 3 | 0.4 | 2.4 | 0.2 | 1.4 | 80 | 70 | 200 |
| 4 | 0.7 | 4.9 | 0.4 | 2.8 | 100 | 80 | 200 |
| 5 | 0.6 | 4.1 | 0.2 | 1.3 | 100 | 70 | 200 |

TABLE 2

| Sample No. | Dielectric σ² is statistically significantly smaller than electrode σ² | Negative correlation statistically confirmed | Thickness standard deviation of dielectric layers (dielectric σ) [μm] | Thickness standard deviation of internal electrode layers (electrode σ) [μm] | dielectric σ/ electrode σ | Average thickness of dielectric layers (ATd) [μm] | Average thickness of internal electrode layers (ATe) [μm] | ATe/ ATd | Accelerated lifetime [h] | Breakdown voltage [V] | Number of craks (Test number 100) |
|---|---|---|---|---|---|---|---|---|---|---|---|
| 1 | No | No | 0.102 | 0.058 | 1.77 | 0.51 | 0.61 | 1.20 | 1.7 | 31 | 0/100 |
| 2 | No | No | 0.048 | 0.047 | 1.01 | 0.53 | 0.57 | 1.08 | 16.0 | 51 | 8/100 |
| 3 | Yes | Yes | 0.054 | 0.088 | 0.62 | 0.53 | 0.59 | 1.11 | 17.5 | 57 | 0/100 |
| 4 | Yes | Yes | 0.052 | 0.080 | 0.65 | 0.51 | 0.52 | 1.02 | 17.3 | 53 | 0/100 |
| 5 | Yes | Yes | 0.045 | 0.095 | 0.48 | 0.50 | 0.57 | 1.16 | 19.6 | 55 | 0/100 |

TABLE 3

| Sample No. | Young's modulus [GPa] Sheet body — Green sheet as first layer | Young's modulus [GPa] Sheet body — Internal electrode pattern layer as second layer | Young's modulus [GPa] Sheet body — Green sheet as third layer | Young's modulus [GPa] Sheet body — Internal electrode pattern layer as fourth layer | Binder type of internal electrode pattern layer as second layer | Binder type of internal electrode pattern layer as fourth layer | Temp increasing rate [° C./h] |
|---|---|---|---|---|---|---|---|
| 11 | 0.4 | 2.7 | 0.4 | 1.1 | ethylcellulose molecular weight 140000 | ethylcellulose molecular weight 100000 | 200 |

TABLE 4

| Sample No. | Dielectric σ² is statistically significantly smaller than electrode σ² | Negative correlation statistically confirmed | Thickness standard deviation of dielectric layers (dielectric σ) [μm] | Thickness standard deviation of internal electrode layers (electrode σ) [μm] | dielectric σ/ electrode σ | Average thickness of dielectric layers (ATd) [μm] | Average thickness of internal electrode layers (ATe) [μm] | ATe/ ATd | Accelerated lifetime [h] | Breakdown voltage [V] | Number of craks (Test number 100) |
|---|---|---|---|---|---|---|---|---|---|---|---|
| 11 | Yes | Yes | 0.058 | 0.079 | 0.74 | 0.54 | 0.59 | 1.09 | 16.3 | 56 | 0/100 |

TABLE 5

| Sample No. | Young's modulus [GPa] First sheet body — Green sheet as first layer | Young's modulus [GPa] First sheet body — Internal electrode pattern layer as second layer | Rolling | Temp increasing rate [° C./h] |
|---|---|---|---|---|
| 21 | 0.4 | 2.3 | performed | 200 |

TABLE 7

| Sample No. | Young's modulus [GPa] First sheet body — Green sheet as first layer | Young's modulus [GPa] First sheet body — Internal electrode pattern layer as second layer | Addition of carbon to internal electrode pattern layer | Temp increasing rate [° C./h] |
|---|---|---|---|---|
| 31 | 1.0 | 2.4 | added | 50 |

TABLE 6

| Sample No. | Dielectric σ² is statistically significantly smaller than electrode σ² | Negative correlation statistically confirmed | Thickness standard deviation of dielectric layers (dielectric σ) [μm] | Thickness standard deviation of internal electrode layers (electrode σ) [μm] | dielectric σ/ electrode σ | Average thickness of dielectric layers (ATd) [μm] | Average thickness of internal electrode layers (ATe) [μm] | ATe/ ATd | Accelerated lifetime [h] | Breakdown voltage [V] | Number of craks (Test number 100) |
|---|---|---|---|---|---|---|---|---|---|---|---|
| 21 | Yes | Yes | 0.049 | 0.072 | 0.69 | 0.51 | 0.53 | 1.04 | 18.0 | 57 | 0/100 |

TABLE 8

| Sample No. | Dielectric σ² is statistically significantly smaller than electrode σ² | Negative correlation statistically confirmed | Thickness standard deviation of dielectric layers (dielectric σ) [μm] | Thickness standard deviation of internal electrode layers (electrode σ) [μm] | dielectric σ/ electrode σ | Average thickness of dielectric layers (ATd) [μm] | Average thickness of internal electrode layers (ATe) [μm] | ATe/ ATd | Accelerated lifetime [h] | Breakdown voltage [V] | Number of crakcs (Test number 100) |
|---|---|---|---|---|---|---|---|---|---|---|---|
| 31 | Yes | Yes | 0.050 | 0.099 | 0.51 | 0.56 | 0.60 | 1.07 | 17.3 | 52 | 0/100 |

TABLE 9

| | Viscosity (100 rpm) [cP] | | | |
|---|---|---|---|---|
| Sample No. | Dielectric layer paste as first layer | Internal electrode layer paste as second layer | Dielectric layer paste as third layer | Internal electrode layer paste as fourth layer |
| 41 | 70 | 1.4E+04 | 60 | 1.1E+04 |
| 42 | 70 | 1.0E+04 | 25 | 1.3E+04 |
| 43 | 68 | 1.4E+04 | 77 | 3.4E+03 |

TABLE 10

| Sample No. | Dielectric σ² is statistically significantly smaller than electrode σ² | Negative correlation statistically confirmed | Thickness standard deviation of dielectric layers (dielectric σ) [μm] | Thickness standard deviation of internal electrode layers (electrode σ) [μm] | dielectric σ/ electrode σ | Average thickness of dielectric layers (ATd) [μm] | Average thickness of internal electrode layers (ATe) [μm] | ATe/ ATd | Accelerated lifetime [h] | Breakdown voltage [V] | Number of crakcs (Test number 100) |
|---|---|---|---|---|---|---|---|---|---|---|---|
| 41 | No | No | 0.048 | 0.047 | 1.01 | 0.52 | 0.56 | 1.08 | 18.9 | 59 | 11/100 |
| 42 | No | No | 0.120 | 0.074 | 1.62 | 0.52 | 0.55 | 1.07 | 1.4 | 38 | 0/100 |
| 43 | Yes | Yes | 0.048 | 0.073 | 0.66 | 0.57 | 0.63 | 1.10 | 13.0 | 59 | 0/100 |

TABLE 11

| | Young's modulus [GPa] | | | | Drying Temp of internal electrode pattern layer of first sheet body (Ta) [° C.] | Drying Temp of internal electrode pattern layer of second sheet body (Tb) [° C.] | Temp increasing rate [° C./h] | coating ratio |
|---|---|---|---|---|---|---|---|---|
| | First sheet body | | Second sheet body | | | | | |
| Sample No. | Green sheet as first layer | Internal electrode pattern layer as second layer | Green sheet as first layer | Internal electrode pattern layer as second layer | | | | |
| 3 | 0.4 | 2.4 | 0.2 | 1.4 | 80 | 70 | 200 | 95% |
| 51 | 0.5 | 2.2 | 0.3 | 1.0 | 80 | 70 | 200 | 80% |

TABLE 12

| Sample No. | Dielectric σ² is statistically significantly smaller than electrode σ² | Negative correlation statistically confirmed | Thickness standard deviation of dielectric layers (dielectric σ) [μm] | Thickness standard deviation of internal electrode layers (electrode σ) [μm] | dielectric σ/ electrode σ | Average thickness of dielectric layers (ATd) [μm] | Average thickness of internal electrode layers (ATe) [μm] | ATe/ ATd | Accelerated lifetime [h] | Breakdown voltage [V] | Number of crakcs (Test number 100) | Number of crakcs (Test number 1000) |
|---|---|---|---|---|---|---|---|---|---|---|---|---|
| 3 | Yes | Yes | 0.054 | 0.088 | 0.62 | 0.52 | 0.59 | 1.11 | 17.5 | 57 | 1/100 | 0/1000 |
| 51 | Yes | Yes | 0.052 | 0.093 | 0.55 | 0.52 | 0.61 | 1.18 | 10.5 | 50 | 0/100 | 2/1000 |

TABLE 13

| Sample No. | Young's modulus [GPa] First sheet body Green sheet as first layer | Young's modulus [GPa] First sheet body Internal electrode pattern layer as second layer | Young's modulus [GPa] Second sheet body Green sheet as first layer | Young's modulus [GPa] Second sheet body Internal electrode pattern layer as second layer | Drying Temp of internal electrode pattern layer of first sheet body (Ta) [° C.] | Drying Temp of internal electrode pattern layer of second sheet body (Tb) [° C.] | Particle size variation of conductive material (D90-D10) | Temp increasing rate [° C./h] |
|---|---|---|---|---|---|---|---|---|
| 3 | 0.4 | 2.4 | 0.2 | 1.4 | 80 | 70 | 0.8 μm | 200 |
| 61 | 0.5 | 2.0 | 0.3 | 1.5 | 80 | 70 | 0.5 μm | 200 |
| 62 | 0.3 | 2.7 | 0.3 | 1.2 | 80 | 70 | 0.3 μm | 200 |

TABLE 14

| Sample No. | Dielectric $\sigma^2$ is statistically significantly smaller than electrode $\sigma^2$ | Negative correlation statistically confirmed | Thickness standard deviation of dielectric layers (dielectric σ) [μm] | Thickness standard deviation of internal electrode layers (electrode σ) [μm] | dielectric σ/ electrode σ | Average thickness of dielectric layers (ATd) [μm] | Average thickness of internal electrode layers (ATe) [μm] | ATe/ATd | Accelerated lifetime [h] | Breakdown voltage [V] | Number of crakcs (Test number 100) | Number of crakcs (Test number 1000) |
|---|---|---|---|---|---|---|---|---|---|---|---|---|
| 3 | Yes | Yes | 0.054 | 0.088 | 0.62 | 0.53 | 0.59 | 1.11 | 17.5 | 57 | 0/100 | 0/1000 |
| 61 | Yes | Yes | 0.043 | 0.079 | 0.54 | 0.53 | 0.55 | 1.04 | 13.9 | 54 | 0/100 | 0/1000 |
| 62 | Yes | Yes | 0.059 | 0.069 | 0.86 | 0.57 | 0.64 | 1.11 | 11.7 | 55 | 0/100 | 3/1000 |

When the thickness variation of the internal electrode layers was larger than the thickness variation of the dielectric layers (Sample Nos. 3 to 5, 11, 21, 31, 43, 51, 61, and 62), the accelerated lifetime was longer than 1.4 hours, the breakdown voltage was higher than 38 V, and the number of cracks in 100 tests was 0. On the contrary to this, when the thickness variation of the internal electrode layers was smaller than the thickness variation of the dielectric layers (Sample Nos. 1, 2, 41, 42), the accelerated lifetime was 1.4 hours or shorter, the breakdown voltage was 38 V or less, or the number of cracks in 100 tests was more than 0.

NUMERICAL REFERENCES

2 . . . Multilayer ceramic capacitor
4 . . . Element body
6 . . . First terminal electrode
8 . . . Second terminal electrode
10 . . . Dielectric layer
12 . . . Internal electrode layer
100*a*, 100*b*, 100*c*, 100*d* . . . Green sheet
120*a*, 120*b*, 120*c*, 120*d* . . . Internal electrode pattern layer
140 . . . Support
160*a* . . . First sheet body
160*b* . . . Second sheet body
160*c* . . . Sheet body

What is claimed is:

1. A multilayer electronic component comprising an element body in which at least one dielectric layer and at least one internal electrode layer are stacked in an alternating manner, wherein
    a thickness variation of the at least one internal electrode layer is larger than a thickness variation of the at least one dielectric layer,
    a thickness of a dielectric layer selected from the at least one dielectric layer and a thickness of an internal electrode layer selected from the at least one internal electrode layer which is adjacent to the dielectric layer in a stacking direction have a negative correlation,
    a p-value is less than 0.05 when a one-tailed test of Pearson product moment correlation coefficient at a significance level of 0.05 is performed.

2. The multilayer electronic component according to claim 1, wherein a thickness standard deviation of the at least one internal electrode layer is larger than a thickness standard deviation of the at least one dielectric layer.

3. The multilayer electronic component according to claim 1, wherein a thickness variance of the at least one dielectric layer is statistically significantly smaller than a thickness variance of the at least one internal electrode layer.

4. The multilayer electronic component according to claim 1, wherein an average thickness of the at least one internal electrode layer is thicker than an average thickness of the at least one dielectric layer.

5. The multilayer electronic component according to claim 1, wherein a coating ratio of the at least one internal electrode layer is 85% or more.

6. The multilayer electronic component according to claim 1, wherein
    the thickness of the dielectric layer selected from the at least one dielectric layer is measured from 100 positions or more, and
    the thickness of the internal electrode layer selected from the at least one internal electrode layer is measured from 100 positions or more.

* * * * *